W. DRISCOLL.
Animal-Trap.
No. 223,324.        Patented Jan. 6, 1880.
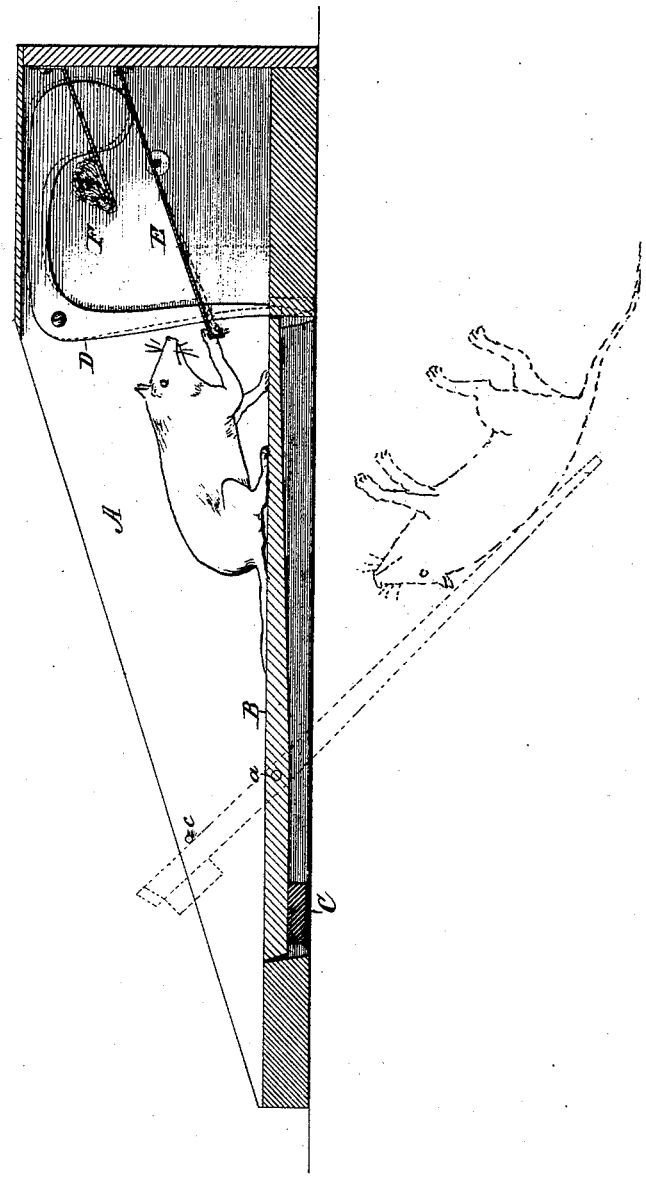
WITNESSES:
INVENTOR:
Wm Driscoll
BY
ATTORNEYS.

UNITED STATES PATENT OFFICE.

WILLIAM DRISCOLL, OF BROCKVILLE, ONTARIO, CANADA.

ANIMAL-TRAP.

SPECIFICATION forming part of Letters Patent No. 223,324, dated January 6, 1880.

Application filed August 12, 1879.

*To all whom it may concern:*

Be it known that I, WILLIAM DRISCOLL, of Brockville, Province of Ontario, Dominion of Canada, have invented a new and Improved Self-Setting Animal-Trap; and I do hereby declare that the following is a full, clear, and exact description of the same, reference being had to the accompanying drawing, forming part of this specification, in which the figure is a sectional longitudinal section, showing in dotted lines the tilted position of the platform or table.

My invention is an improvement upon that form of animal-trap in which the weight of the animal is made to release a tilting platform and allow the animal to be precipitated into a tank of water, a barrel, or other receptacle placed beneath the trap. In this form of trap it has been a desideratum to secure a latch mechanism for locking the platform which shall be sufficiently sensitive to be tripped by small animals, like mice, as well as by rats or larger animals. My improvement aims at this result; and it consists in combining the tilting platform with a right-angular latch-bar and a tilting pan located beneath the pivot and horizontal arm of the right-angular latch-bar, so that when the front edge of the pan is depressed by the efforts of the animal to get at the bait above, the opposite end of the pan raises by direct pressure the horizontal arm of the lever, and by turning it on its pivot causes its vertical arm, bearing a catch, to be removed from beneath the edge of the tilting platform, when the latter falls and dumps the animal into a pit or receptacle below.

In the drawing I have shown what I conceive to be the best mode of constructing my improved trap, in which A is a wooden or an iron box, made large enough for the animal to be caught, and having inclined walls to its open side. The bottom of the box is divided into three parts, of which the two end parts are stationary and hold the sides of the box together, while the middle portion, B, is an elongated tilting platform, supported upon pivots *a*, and provided at its back end with a counter-weight, C, just heavy enough to restore the platform to its horizontal position, and latch it after being tilted. The long end of the platform or table is held up by a beveled or shouldered latch-head formed upon the vertical pendent arm of the right-angular bar D. This bar is pivoted at its angle to one of the sides of the box, and is cast or stamped out with a horizontal weighted arm. The horizontal arm of this right-angular bar is acted upon by another small lever or tilting pan, E, which is deflected by the animal placing its paws upon the front and longer portion of the same in its efforts to get at the bait, which is placed on a shelf, F, located higher up and a little farther back than the pan, so that in order to get at the bait the animal is forced to place its front paws upon the tilting pan E, by which means the trap is set off, and the animal's weight being at that time on the tilting table or platform B, the latter is overbalanced, and the animal, being unable to cling to the tilting pan by reason of its smooth metallic surface, is thrown upon his back and precipitated into the receptacle placed below to receive him, as shown in dotted lines.

As soon as the tilting table is cleared of the animal the back weight raises the long end of the table, which strikes the beveled face of the latch and pushes it aside until the shoulder is beneath the table or platform, when the weighted arm of the bar D forces it into its holding position, thus automatically setting the trap for the next animal.

With respect to the merit of the tripping device described, I would say that the parts are not only nicely balanced, but the arrangement of the leverage of the tilting pan to the right-angular latch-bar is such as to secure great sensitiveness of action, so much so that small mice and large rats are caught with equal certainty.

In adapting my trap to the larger animals of the woods, it is made on a correspondingly larger scale, and a right-angular latch-bar is arranged upon each side of the tilting pan, and both are operated upon in a similar manner by the tilting pan. The double latches in this case avoid any sinking or giving of one side of the platform, and allow heavy animals to approach the tilting pan with confidence.

When the box of my improved trap is made of wood the cross-pieces which secure the two sides of the box should be arranged with the grain of the wood running longitudinally and in the same direction as that of the tilting table. This provision is designed to avoid any binding between the tilting table and the sides of the box, for I have observed that when located in damp cellars, if the grain of the tilting table be longitudinal and the grain of the cross-pieces be at right angle thereto, the table will swell laterally and bind against the walls of the box. This grows out of the fact that wood swells laterally to the grain more than it does lengthwise the grain. To correct this difficulty the cross-pieces connecting the two walls of the box should have the grain running in the same direction as the tilting table, to cause all parts to expand and contract alike; or the whole may be made of iron.

To limit the dip or downward throw of the tilting table a pin or stop, c, is fastened to the sides of the box; and to stop the table in its return to its horizontal position without rebound the back weighted edge of the table is cut with a bevel, and the cross-piece is also cut with a bevel, which is a little shorter than that of the table.

I am aware of the fact that it is not broadly new to combine a tilting platform with a tilting pan by means of a right-angular lever and a connecting-rod. By placing the tilting pan, however, below the pivot and right-angular arm of the lever, I make the single lever D perform the necessary connection, and thus not only greatly simplify the construction of the trap, but secure great sensitiveness and reduce the lost motion of joints to a minimum.

Having thus described my invention, what I claim as new is—

The combination, with the tilting platform B and the tilting pan E, of the right-angular latch-bar D, having its pivot and horizontal arm above the tilting pan, and its said horizontal arm resting directly upon said pan, as and for the purpose described.

The above specification of my invention signed by me this 30th day of July, 1879.

WM. DRISCOLL.

Witnesses:
EDWD. W. BYRN,
SOLON C. KEMON.